(12) United States Patent
Tufail et al.

(10) Patent No.: US 11,333,088 B2
(45) Date of Patent: May 17, 2022

(54) METHODS AND SYSTEMS FOR A VEHICLE

(71) Applicant: Ford Global Technologies, LLC, Dearborn, MI (US)

(72) Inventors: Khizer Tufail, London (GB); Tim Winstanley, Bishops Stortford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/012,729

(22) Filed: Sep. 4, 2020

(65) Prior Publication Data

US 2021/0071602 A1    Mar. 11, 2021

(30) Foreign Application Priority Data

Sep. 6, 2019 (GB) ..................... 1912828

(51) Int. Cl.
*F02D 23/00* (2006.01)
*F02D 41/00* (2006.01)

(52) U.S. Cl.
CPC ..... *F02D 41/0007* (2013.01); *B60W 2540/10* (2013.01); *F05D 2220/40* (2013.01)

(58) Field of Classification Search
CPC ....... F02B 37/18; F02B 37/22; F02D 41/0007
USPC ............................................. 60/602, 605.2
See application file for complete search history.

(56) References Cited

U.S. PATENT DOCUMENTS

| 6,155,049 A | 12/2000 | Bischoff |
| 6,378,307 B1 * | 4/2002 | Fledersbacher ......... F02B 37/24 60/605.2 |
| 2003/0060328 A1 | 3/2003 | Beaty |
| 2003/0182940 A1 | 10/2003 | Nishiyama et al. |
| 2006/0016188 A1 | 1/2006 | Kennedy |
| 2007/0144172 A1* | 6/2007 | Sumser .................. F02B 39/12 60/602 |
| 2009/0007564 A1* | 1/2009 | Suzuki ............... F02D 13/0269 60/602 |
| 2011/0000470 A1* | 1/2011 | Roth .................. F02D 13/0249 123/568.11 |
| 2014/0298805 A1 | 10/2014 | Takayanagi |
| 2017/0037786 A1 | 2/2017 | Fabien et al. |
| 2017/0276067 A1 | 9/2017 | Hand, III et al. |
| 2018/0355814 A1 | 12/2018 | Magner et al. |
| 2019/0024574 A1* | 1/2019 | Upadhyay ........... F04D 29/4213 |

(Continued)

FOREIGN PATENT DOCUMENTS

| EP | 0136858 A1 | 4/1985 |
| EP | 2522839 A2 | 11/2012 |
| JP | H0953457 A | 2/1997 |

(Continued)

OTHER PUBLICATIONS

Great Britain Intellectual Property Office, Combined Search and Examination Report under Sections 17 and 18(3) Issued in Application No. GB1912828.9, dated Feb. 20, 2020, 6 pages.

*Primary Examiner* — John Kwon
(74) *Attorney, Agent, or Firm* — Geoffrey Brumbaugh; McCoy Russell LLP

(57) ABSTRACT

Methods and systems are provided for a turbocharger. A system comprises a variable geometry turbocharger comprising a plurality of vanes, wherein the plurality of vanes is operated during a low-load transient event to conserve boost pressure from a previous high-load transient event to reduce lag during a proceeding high-load transient event.

16 Claims, 5 Drawing Sheets

(56) References Cited

U.S. PATENT DOCUMENTS

2019/0368373 A1* 12/2019 Hu ................... F04D 27/0253
2019/0368374 A1* 12/2019 Hu ................... F04D 27/0223

FOREIGN PATENT DOCUMENTS

JP       H10141075 A     5/1998
JP       2001295674     10/2001

* cited by examiner

METHODS AND SYSTEMS FOR A VEHICLE

CROSS REFERENCE TO RELATED APPLICATIONS

The present application claims priority to United Kingdom Patent Application No. 1912828.9 filed on Sep. 6, 2019. The entire contents of the above-listed application is hereby incorporated by reference for all purposes.

FIELD

The present description relates generally to operating a turbocharger of a vehicle.

BACKGROUND/SUMMARY

Turbochargers may be used in vehicles to provide pressurized air boosts (boost pressure) to an engine when load on an engine is increased, in order to improve the supply of oxygen to the engine. Systems having turbochargers can suffer from boost lag, where there is a lag time between the load change and the provision of pressurized boost air to the engine.

In one example, engine transient conditions may represent a condition typically introduced by a vehicle operator via accelerator pedal tip-in or tip-out. An engine control unit (ECU) may respond to the transient condition by increasing or decreasing an engine transient torque load-step. During the onset of a tip-in transient, deviation from a steady-state optimized set-point in engine boost pressure (as well as temperature and mass flow) may be encountered and this may contribute toward an increase in emissions. As the boost pressure deviation increases, the engine air/fuel ratio may be reduced, resulting in increased soot emissions, opposed to $NO_x$ emissions during early stages of the transient.

Recent legislative changes have extended the engine operation to higher speed and load operation resulting with higher load-steps and possible increased emissions spikes. Furthermore, incorporation of internal combustion engines in hybrid electric vehicles increases in popularity, resulting in additional demands of the engine to activate and deactivate, which may increase a frequency of engine transient conditions.

In one example, the issues described above may be addressed by a system, comprising an engine, an accelerator pedal, a variable geometry turbocharger comprising a plurality of vanes adjacent a turbine inlet, and a controller with computer-readable instructions stored on non-transitory memory thereof that when executed enable the controller to adjust the plurality of vanes to a closed position in response to an accelerator tip-out following an accelerator tip-in.

As one example, boost pressure generated during a previous tip-in event is conserved despite a driver demand during a tip-out desiring a lower boost pressure. The controller may actuate the plurality of vanes and a wastegate during the tip-out to mitigate compressor surge while conserving some of the boost pressure to minimize lag during a subsequent tip-in. By doing this, the emissions described above may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
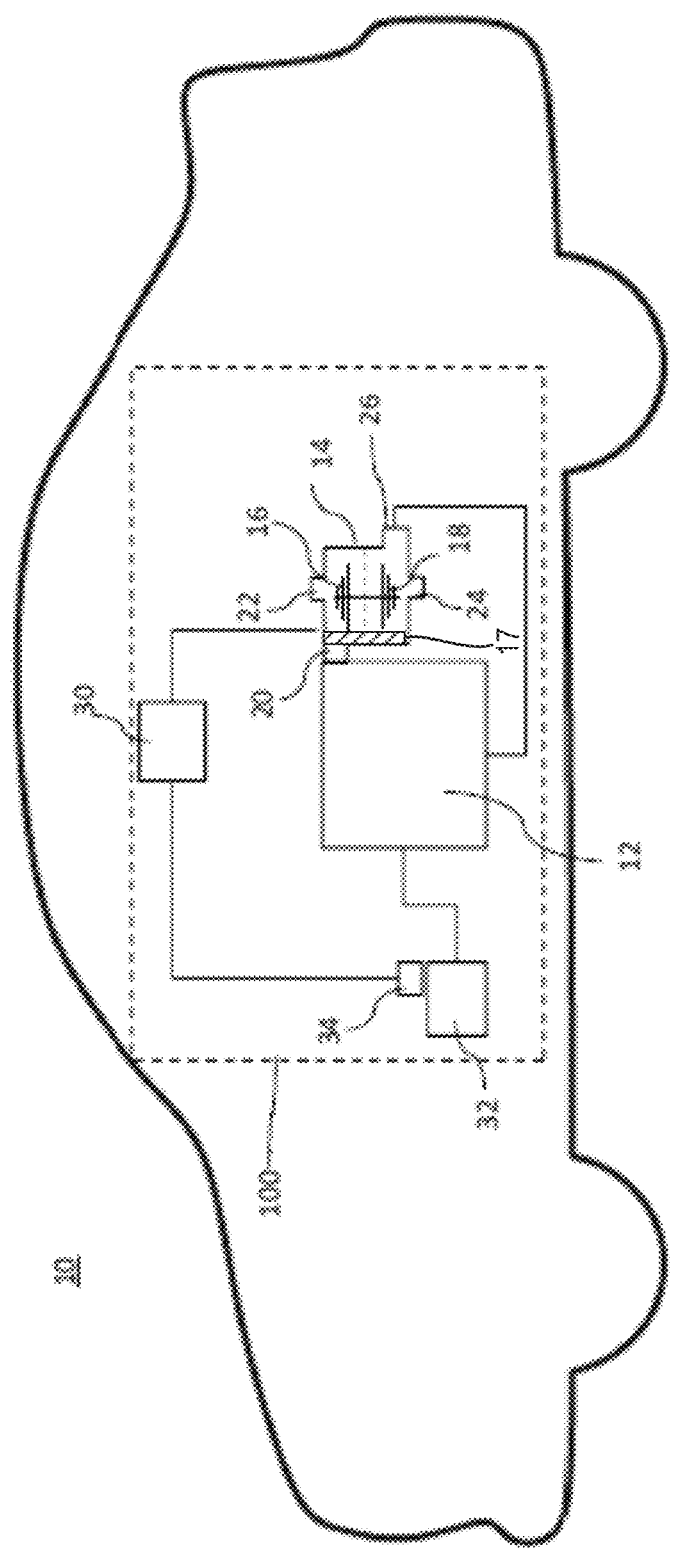
FIG. 1 schematically shows a vehicle comprising a system for reducing boost lag in a turbocharger.

The following description relates to systems and methods for a turbocharger. In one example, the methods and systems described herein relate to minimizing emissions during transient engine conditions. The turbocharger of the present disclosure may be operated to reduce boost pressure deviations (e.g., transient boost) to decrease transient emissions.

According to a first aspect, there is provided a method of operating a variable nozzle turbocharger of a vehicle, the vehicle having an engine, a variable nozzle turbocharger and a pedal moveable between a tip-out position and a tip-in position to control a fuel injection rate into a combustion chamber of the engine, the method comprising receiving a position signal relating to a position of a pedal; determining whether the signal is indicative of the pedal being in the tip-out position corresponding to a minimum fuel injection rate, and controlling variable vanes of the turbocharger to at least partially close in response to determining that the pedal is in the tip-out position.

At least partially closing the vanes involves reducing the size of openings between the vanes.

The method may comprise receiving a second position signal relating to a position of a pedal after controlling the variable vanes of the turbocharger to at least partially close; and controlling the variable vanes to re-open in response to determining that the second position signal indicates movement of the pedal towards the tip-in position.

The signal may indicate movement of the pedal towards the tip-in position when the signal indicates that the pedal is not in the tip-out position.

According to a second aspect, there is provided a controller for a vehicle having an engine, a pedal and a variable nozzle turbocharger, wherein the pedal is moveable between a tip-out position and a tip-in position to control a fuel injection rate into a combustion chamber of the engine; wherein the controller is configured to receive a position signal relating to a position of the pedal, and to determine whether the pedal is in the tip-out position corresponding to a minimum fuel injection rate based on the position signal, wherein the controller is configured to at least partially close variable vanes of the turbocharger in response to determining that the pedal is in the tip-out position.

According to a third aspect, there is provided a turbocharger control system comprising a controller in accordance with the second aspect, and a sensor configured to generate the position signal relating to the position of the pedal.

According to a fourth aspect, there is provided a vehicle comprising an engine, a variable nozzle turbocharger, and a pedal, wherein the pedal is moveable between a tip-out position and a tip-in position to control the fuel injection rate of fuel into a combustion chamber of the engine, the vehicle further comprising a turbocharger control system in accordance with the third aspect.

According to a fifth aspect, there is provided a machine readable medium comprising instructions configured to be executed by a processor to cause performance of a method in accordance with the first aspect.

FIG. 1 shows a vehicle 10, which in this example is a motor vehicle comprising a drive system 100 for driving the vehicle 10. The system 100 comprises an engine 12 and a turbocharger 14 in fluid communication with the engine 12. The turbocharger 14 is configured to provide boost pressure (i.e. compressed air at a pressure higher than atmospheric pressure) into an air intake of the engine 12 to increase the volumetric efficiency of the engine 12 (i.e. to improve the air to fuel ratio (AFR) in the engine 12 during use). The turbocharger 14 is configured to vary the amount of compressed air provided to the engine 12, in order to maintain the AFR in the engine 12 within acceptable bounds in use, for example an AFR of between approximately 15-25 in lean-burn, or approximately 14 in rich-burn.

The turbocharger 14 comprises a turbine 16, a turbine inlet 20, a turbine outlet 22, a compressor 18, a compressor inlet 24 and a compressor outlet 26. The turbine 16 is driven by exhaust gas from the engine 12, which enters through the turbine inlet 20. The compressor 18 is directly connected to the turbine 16 such that rotation of the turbine 16 causes corresponding rotation of the compressor 18. Atmospheric air enters the compressor 18 through the compressor inlet 24, and is discharged as compressed air from the compressor 18 through the compressor outlet 26. The compressor outlet 26 is fluidically connected to the engine 12 so as to provide compressed air to the engine 12 for mixing with fuel and combusting.

The turbocharger 14 in this example is a variable nozzle turbocharger (VNT), also known as a variable geometry turbocharger (VGT), which comprises a plurality of vanes disposed circumferentially around the turbine 16.

The vanes 17 are configured to vary in pitch, such that the speed of the turbine 16 for given inlet flow conditions, and thus of the compressor 18 can be changed by varying the angle of the vanes. For example, by closing the vanes 17 (i.e. reducing the size of openings between the vanes), the exhaust gasses entering the turbine 16 through the turbine inlet 20 are accelerated through the openings between the vanes 17, and thus the turbine 16 is induced to rotate faster. Faster rotation of the turbine 16 causes faster rotation of the compressor 18 and therefore more compression of the air entering the compressor 18 through the compressor air inlet 24. This results in a higher boost pressure being provided to the engine 12. Conversely, opening the variable vanes 17 (i.e. increasing the size of openings between the vanes) reduces the acceleration of the exhaust gasses through the vanes 17 because the openings between the vanes are larger. Reducing the acceleration of the exhaust gasses reduces the speed at which the turbine 16 and compressor 18 rotate for the same amount of exhaust gas entering the turbine 16. This therefore reduces the boost pressure provided to the engine 12.

The system 100 comprises a controller 30 which is configured to control the pitch of the variable vanes of the turbocharger 14, and thereby to control the speed of rotation of the turbine 16 and compressor 18. Therefore, the controller 30 is configured to control the amount of boost pressure provided to the engine 12 by the turbocharger 14.

During normal operation (e.g., non-transient operation), the controller 30 controls the pitch of the variable vanes during use of the vehicle 10 to maintain the AFR in the engine 12 within acceptable limits. Therefore, the controller 30 may control the turbocharger 14 to increase the amount of boost pressure provided to the engine 12 when the fuel injection rate into the engine 12 is increased, and vice versa for a reduction in the fuel injection rate.

The system 100 comprises a pedal 32 which is configured to control a fuel injection rate into the engine 12 by its position. The pedal 32 is configured to be manipulated by a user, and is moveable between a tip-out position which corresponds to a minimum fuel injection rate, and a tip-in position which corresponds to a maximum fuel injection rate. In this example, the tip-in position and the tip-out position are both at extreme ends of movement of the pedal 32.

A user may move the pedal 32 to a tip-out position, corresponding to a minimum fuel injection rate, when the user intends the vehicle to coast or during a gear change. These conditions are often followed by an increase in the load on the engine, when the user accelerates again after coasting or a gear change. However, in a conventional turbocharger during coasting or a gear change in which the pedal 32 is in a tip-out position, the boost pressure from the turbocharger will have decreased, and so there is a boost lag (i.e. lag time between the load changing, and additional boost pressure being provided by the turbocharger 14) when the user again moves the pedal 32 towards the tip-in position to accelerate again.

The system 100 comprises a sensor 34 which is configured to monitor the position of the pedal 32. In this example, the sensor 34 monitors the position of the pedal 32 and outputs a position signal which is indicative of the position of the pedal 32 either at the tip-in position or the tip-out position, or anywhere between these positions. The sensor may be configured to output a position signal at periodic intervals to continually monitor the position of the pedal 32.

The controller 30 is configured to conserve the boost pressure during scenarios such as coasting or a gear change. The controller 30 is configured to receive the position signal from the sensor 34 and to determine whether the position signal is indicative of the pedal 32 being in a tip-out position. The controller 30 is configured to deviate from normal operation in response to determining that the pedal 32 is in the tip-out position, by controlling the variable vanes to at least partially close, from a position in which the vanes would be during normal operation.

In some examples, the sensor may be a switch which is only actuated when the pedal is in the tip-out position (e.g. a proximity switch applied to the pedal, such as a hall-effect sensor. In other examples, the sensor may be a switch which is actuated only when the pedal is not in the tip-out position.

In some examples, an existing vehicle may have a system having an engine, a turbocharger, a pedal and/or a sensor. In such systems, the vehicle may be retrofitted to comprise a turbocharger control system having a controller 30 as described above to carry out the method as described below with reference to FIG. 2.

Figure 2:
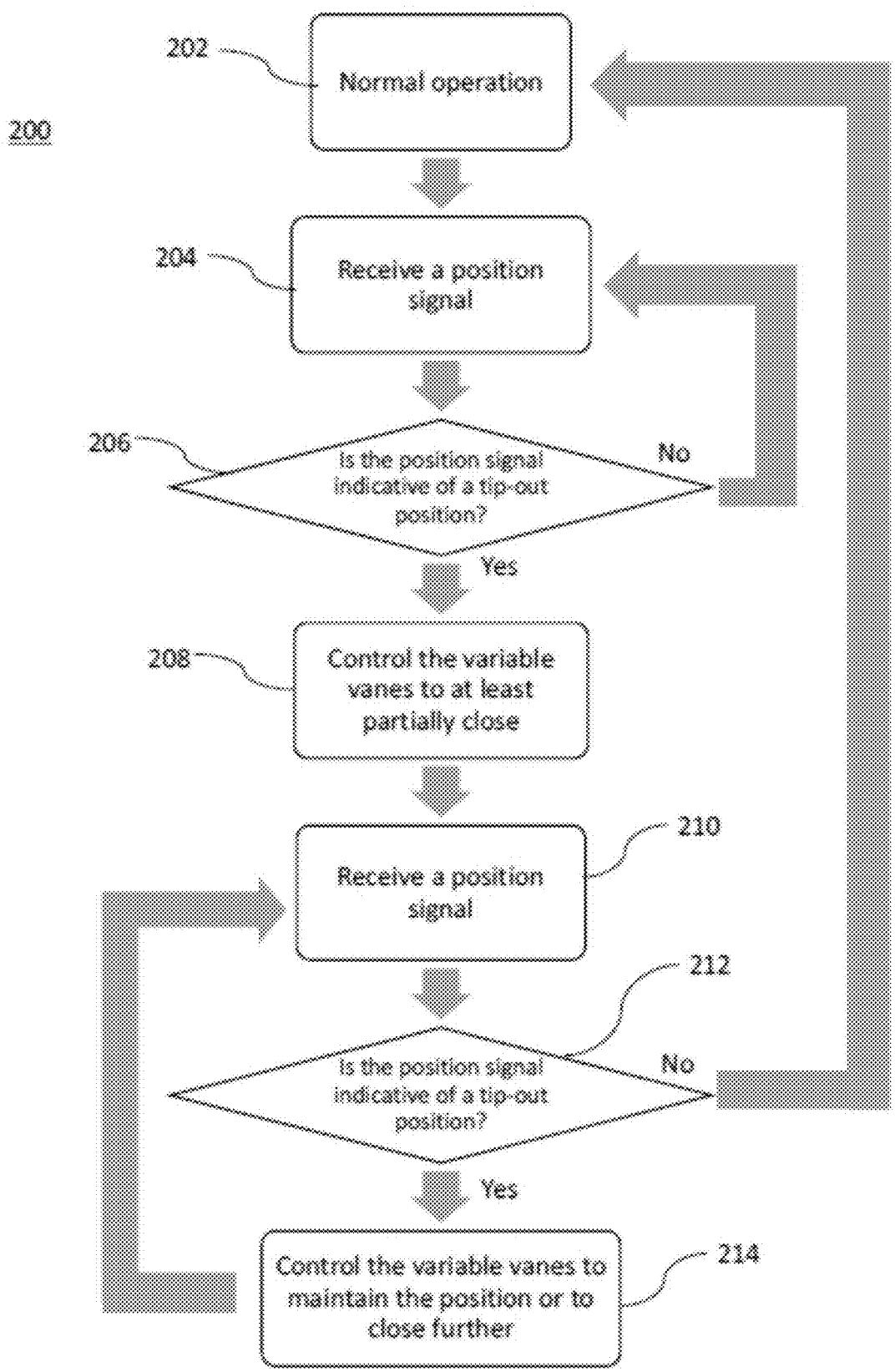
FIG. 2 is a flow chart showing steps of a method for reducing boost lag in a turbocharger.

FIG. 2 is a flow chart showing steps of a method 200 of operating the system 100. Block 202 shows the system 100 beginning in normal operation (i.e. by controlling the vanes to maintain the AFR in the engine 12 within acceptable limits, in order to reduce undesired emissions and optimize the performance of the engine).

Block 204 follows on from block 202 and comprises receiving a position signal from the sensor 34 which is indicative of the position of the pedal 32.

Block 206 follows on from block 204 and comprises determining whether the position signal is indicative of the pedal 32 being in a tip-out position. In this example, the method may determine that the pedal 32 is in a tip-out position by comparing the received position signal to signals in a look-up table, or a controller may perform a calculation based on the signal to determine whether it indicates that the pedal is in a tip-out position. In other examples, when the pedal is in a tip-out position, a switch may be actuated, and a signal may be output from the switch. Receiving the signal may therefore indicate that the pedal is in the tip-out position.

If it is determined that the position signal is not indicative of the pedal 32 being in a tip-out position, then the method 200 returns to block 204 to receive another position signal, and the system 100 continues to operate in normal operation.

If it is determined that the position signal is indicative of a pedal 32 being in a tip-out position, then the method 200 continues to block 208. Block 208 comprises deviating from normal operation and controlling the variable vanes of the turbocharger 14 to at least partially close. At least partially closing the vanes involves changing the pitch of the vanes to reduce the size of openings between the vanes. This conserves the boost pressure delivered by the turbocharger 14 temporarily by accelerating the reducing amount of exhaust gasses through the openings between the vanes.

When the vanes have been at least partially closed, the method 200 continues to block 210, which comprises receiving another position signal.

When the position signal is received from block 210, the method continues to block 212, which comprises determining whether the received position signal from block 210 indicates that the pedal 32 is in a tip-out position. If it is determined that the position signal no longer indicates that the pedal 32 is in a tip-out position, the method returns to block 202, such that the system 100 returns to normal operation. In this case, the boost pressure has been conserved until the pedal 32 is no longer in the tip-out position, so as to reduce the boost lag when acceleration is desired.

If it is determined that the position signal does indicate that the pedal 32 is in a tip-out position, the method 200 moves on to block 214. Block 214 comprises controlling the variable vanes to maintain their position or to close further, and the method 200 returns to block 210 to receive another position signal.

In some examples, the boost pressure which is conserved may need to be discharged due to the pressure being too high. High pressure can result in compressor surge in which the flow of air is intermittently reversed in the compressor 18. Therefore, excess boost pressure may be discharged through a wastegate valve in the turbocharger 14. Alternatively, the controller 30 may interrupt the method 200 described above when there is an excess of boost pressure and discharge some of the boost pressure by opening the vanes.

In previous examples, utilization of boost pressure from a preceding maneuver may be missed. During a tip-in maneuver, an increase in load-step is experienced and transient boost lag condition is encountered where actual instantaneous boost pressure is lower than a desired steady state boost pressure set-point. During a boost lag operation, the variable nozzle turbine control operates with vanes in a closed position so that boost pressure is generated at a maximum rate. As the boost pressure is raised and approaches the desired steady state boost pressure set-point, the vanes may be moved to an open position to slow a boost pressure rate while avoiding non-desired control condition (e.g., over or under shooting boost pressure relative to the optimized set-point). Conversely, during a tip-out maneuver, a decrease in load-step may be experienced and transient boost lag condition may be encountered where actual instantaneous boost pressure is greater than a steady state boost pressure set-point. The vanes may be in a partially or fully open position so that boost pressure is reduced at a maximum rate. As the boost pressure is reduced and approaches a desired steady state set-point, the vanes may be closed to slow a boost pressure decay rate while avoiding a non-desired control condition (e.g., over and under shooting of the boost pressure relative to a desired set-point).

The boost pressure set-point and control may be sustained for a threshold duration to counter undesired control conditions during fast response transient load-steps, which may be used to remove a quick response dynamic ripple in set-point or control. However, due to myriad transient conditions, strategies incorporated in electronic control units (ECU) of previous examples may introduce further boost lags where not desired. As one example, previous control strategies may ignore a previous high load tip-in maneuver which generated a boost pressure for the benefit of a proceeding maneuver, (e.g., tip-in from a low load), and therefore an opportunity is missed to reduce boost-lag that mitigates transient emissions.

Figure 3:
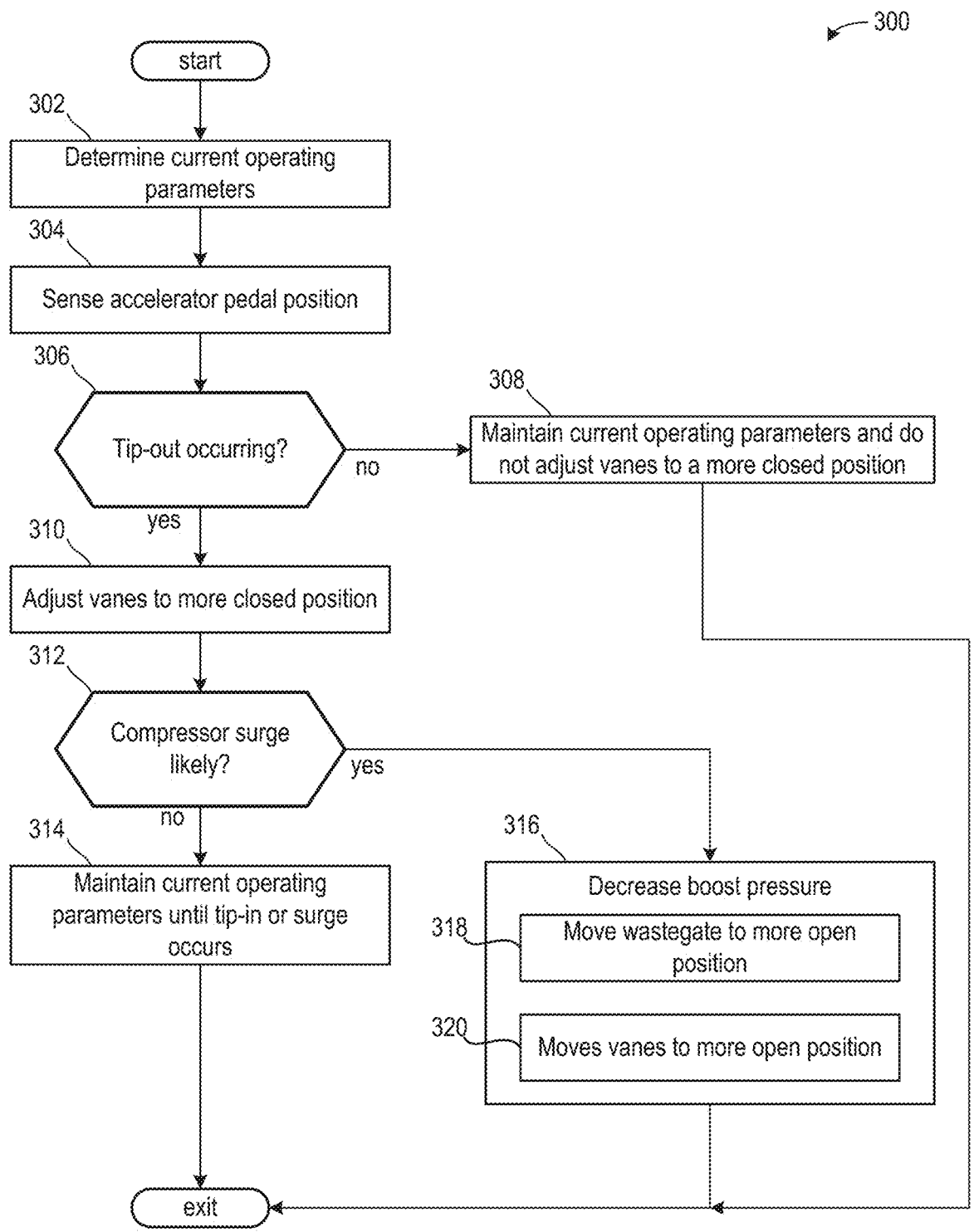
FIG. 3 illustrates a method for injecting air into the exhaust passage.

Turning now to FIG. 3, it shows a method 300 for adjusting operating parameters to optimize boost pressures during a tip-in condition following a tip-out condition. Instructions for carrying out method 300 may be executed by a controller based on instructions stored on a memory of the controller and in conjunction with signals received from sensors of the engine system, such as the sensors described above with reference to FIG. 1 or as described below with reference to FIG. 5. The controller may employ engine actuators of the engine system to adjust engine operation, according to the method described below.

The method 300 proceeds to 302, which includes determining, estimating, and measuring current operating parameters. Current operating parameters may include, but are not limited to, one or more of a throttle position, a manifold vacuum, an engine speed, an engine temperature, a vehicle speed, an exhaust gas recirculation flow rate, and an air/fuel ratio.

The method 300 may proceed to 304, which includes sensing an accelerator pedal position. In one example, a pedal position sensor may be configured to sense a position of the accelerator pedal. The accelerator pedal may be actuated between tip-in and tip-out positions. A tip-in position may include where the accelerator pedal is more depressed than a tip-out position.

The method 300 may proceed to 306, which includes if a tip-out occurring. A tip-out may be occurring if a vehicle operator releases the accelerator pedal. For example, the vehicle operator may desire a lower vehicle speed may apply less to zero pressure to the accelerator pedal. As such, the accelerator pedal may be returned to a more inclined position (e.g., a tip-out relative to a previous pedal position).

If a tip-out is not occurring, then the method 300 may proceed to 308, which includes maintaining current operating parameters and does not adjust a position of the vanes to conserve the boost pressure to reduce emissions during a subsequent tip-in. As such, a position of the vanes may be maintained based on a current driver demand.

If a tip-out is occurring, then the method 300 proceeds to 310, which includes adjusting vanes of the turbine to a more closed position. In some examples, the vanes may be actuated to a fully closed position. As the tip-out occurs, the engine may produce less exhaust gas, resulting in a lower boost pressure. This may result in lag during a subsequent tip-in. However, by closing the vanes during the tip-out, the boost pressure generated during a previous tip-in operation may be maintained for a subsequent tip-in following the tip-out. In one example, this may result in a boost pressure generated being greater than a boost pressure demanded, in preparation of a greater boost pressure demand.

The method 300 proceeds to 312, which includes determining if compressor surge is likely. In one example, compressor surge may be monitored via a compressor map, which tracks mass air flow and a pressure ratio. Thus, as the tip-out occurs, the mass air flow may decrease while the pressure ratio is maintained or decreased at a rate lower than at a rate at which the mass air flow decreases. As such, a surge limit of the compressor may be approached.

If compressor surge is not likely and current operating parameters are not resulting in or leading to surge, then the method 300 may proceed to 314, which includes maintain current operating parameters until a tip-in or surge occurs. As such, boost pressure may still be maintained. The method may continue to monitor compressor conditions to prevent surge from occurring.

If compressor surge is likely, then the method 300 may proceed to 316, which includes decreasing the boost pressure. The boost pressure may be reduced via actuating a wastegate to a more open position at 318 and/or actuating vanes of the turbine to a more open position at 320. As such, compressor surge may be avoided.

Figure 4:
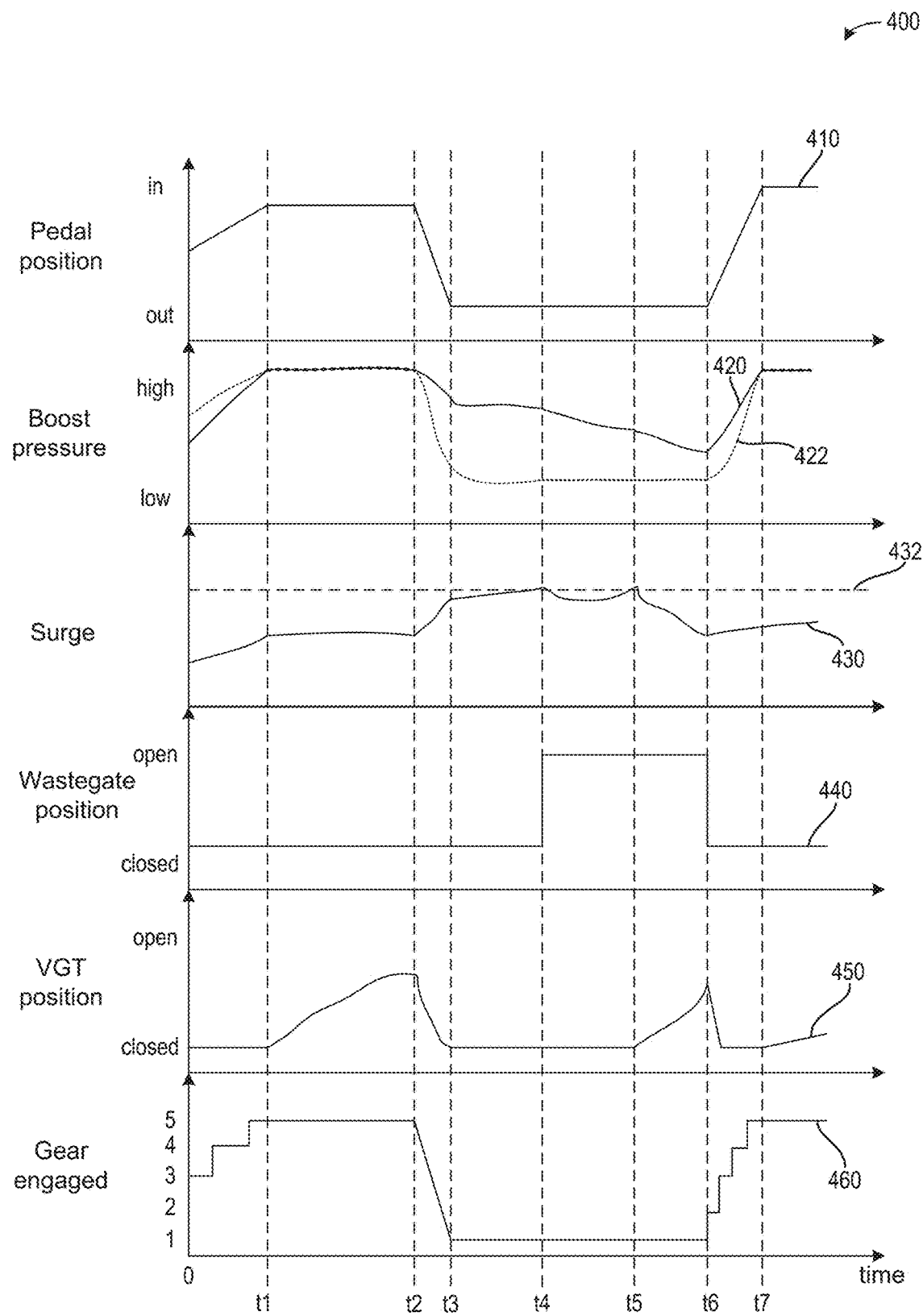
FIG. 4 illustrates a prophetic engine operating sequence relating engine operating parameters and exhaust passage air injections.

Turning now to FIG. 4, it shows a graph 400 illustrating an engine operating sequence of a current example of a turbocharger. Plot 410 illustrates a pedal position. Plot 420 illustrates an actual boost pressure and dashed line 422 illustrates a desired boost pressure. Plot 430 illustrates a likelihood of compressor surge and dashed line 432 illustrates a compressor surge limit. Plot 440 illustrates a wastegate position. Plot 450 illustrates a variable geometry turbine vane position. Plot 460 illustrates an engaged gear. Time increases from a left side to a right side of the figure.

Prior to t1, the pedal position is being further tipped in (plot 410) and the engaged gear increases from the third gear, to a fourth gear, and to a fifth gear (plot 460). As such, the desired boost pressure (dashed line 422) increases as does the actual boost pressure (plot 420). The wastegate is in a fully closed position (plot 440) and the position of the vanes is a fully closed position (plot 450) to reduce the turbo lag. The turbo lag may be equal to the difference between the desired boost pressure and the actual boost pressure. The surge likelihood (plot 430) increases toward the surge limit (plot 432)

At t1, the pedal position remains constant. The actual boost pressure is equal to the desired boost pressure, thereby indicating turbo lag is no longer present. Between t1 and t2, the vanes may be moved to a more open position as the engine begins to produce more exhaust gas, thereby providing enough volume to rotate the turbine and meet the desired boost pressure without artificially increasing the pressure of exhaust gas by closing the vanes.

At t2, the accelerator pedal is released and a tip out begins. The gears may begin to downshift. Between the t2 and t3, the gears decrease from fifth to first. As such, the desired boost pressure decreases. To minimize turbo lag during a future tip-in, the vanes may be moved to a fully closed position and the wastegate may be moved or maintained in a fully closed position to maintain or decrease a rate of decay of the actual boost pressure. By doing this, the likelihood of surge increases in order to maintain the boost pressure for a proceeding tip-in.

At t3, the vanes and wastegate are maintained fully closed. The actual boost pressure remains above the desired boost pressure. The likelihood of surge increases toward a threshold likelihood, wherein beyond the threshold likelihood surge occurs. Between t3 and t4, the likelihood of surge increases toward the threshold likelihood.

At t4, the likelihood of surge is equal to the threshold likelihood. As such, the wastegate is moved to an open position to decrease the boost pressure. Between t4 and t5, the boost pressure decreases. However, the likelihood of surge decreases via the opening of the wastegate. However, as the tip-out condition proceeds with the actual boost pressure being greater than the desired boost pressure, the likelihood of surge increases again back toward the threshold likelihood.

At t5, the likelihood of surge is equal to the threshold likelihood. As such, the vanes are moved to a more open position to decrease the actual boost pressure. Between t5 and t6, the likelihood of surge decrease and the actual boost pressure also decreases to prevent surge.

At t6, a tip-in occurs. Between t6 and t7, the gears increase from the first gear to the fifth gear. The accelerator pedal is more depressed and the desired boost pressure increases. The vanes and the wastegate are closed to allow the actual boost pressure to increase along with the desired boost pressure. As illustrated, lag during the tip-in is avoided due to the boost pressure generated during the previous tip-in being conserved during the tip-out. As such, emissions may be reduced.

At t7, the desired boost pressure and the actual boost pressure are equal. The position of the vanes and the wastegate may be moved based on other conditions outside of avoiding lag. Following t7, the vanes may be moved to more open positions as the engine produces a sufficient amount of exhaust gas to meet the desired boost pressure without closing the vanes.

Figure 5:
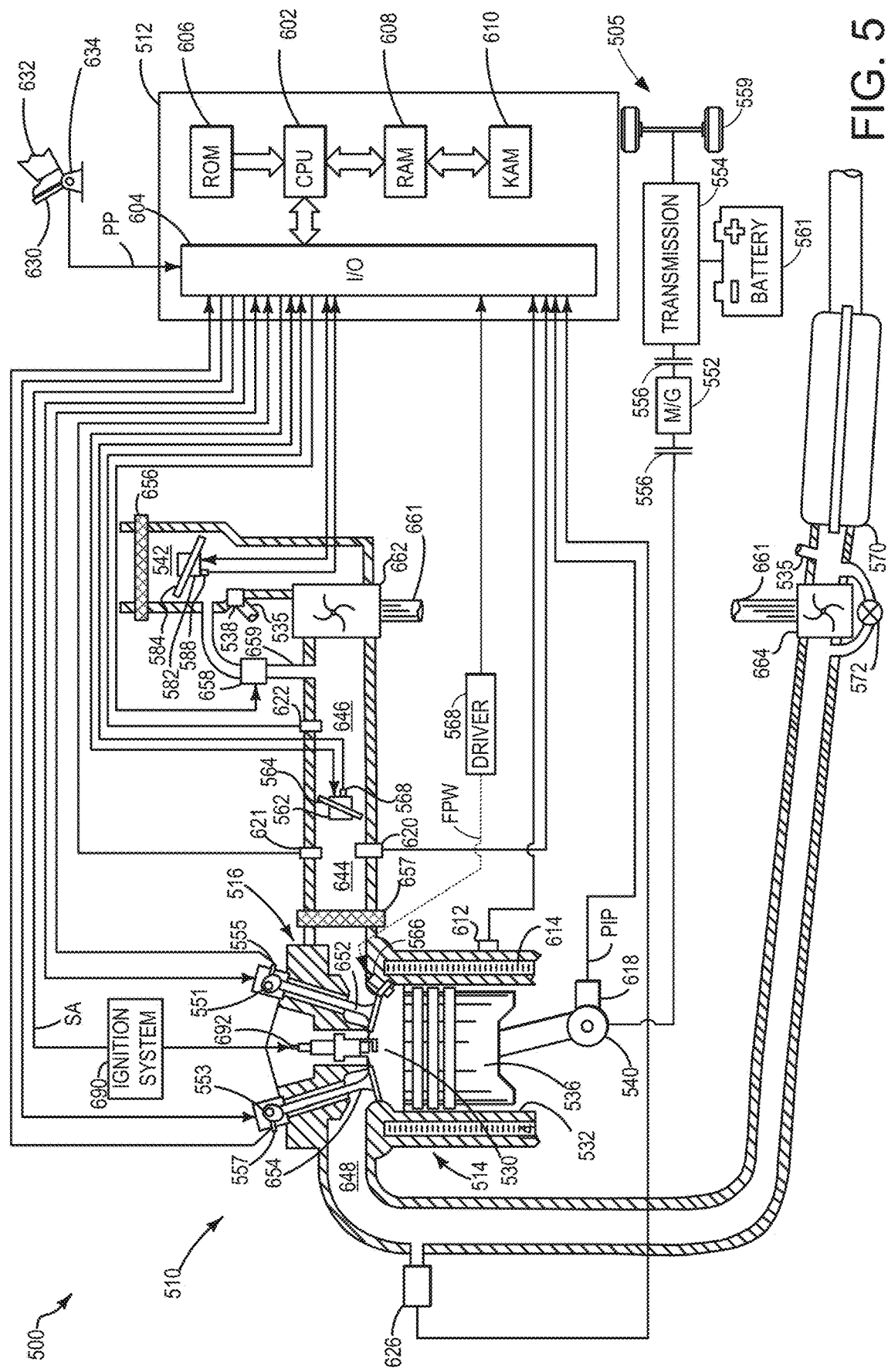
FIG. 5 shows an embodiment of an engine of a hybrid vehicle.

FIGS. 1 and 5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 5 depicts an engine system 500 for a vehicle. The vehicle may be an on-road vehicle having drive wheels which contact a road surface. Engine system 500 includes engine 510 which comprises a plurality of cylinders. FIG. 5 describes one such cylinder or combustion chamber in detail. The various components of engine 510 may be controlled by electronic engine controller 512. In one example, the engine 510 may be used similarly to the engine 12 of FIG. 1.

Engine 510 includes a cylinder block 514 including at least one cylinder bore, and a cylinder head 516 including intake valves 652 and exhaust valves 654. In other examples, the cylinder head 516 may include one or more intake ports and/or exhaust ports in examples where the engine 510 is configured as a two-stroke engine. The cylinder block 514 includes cylinder walls 532 with piston 536 positioned therein and connected to crankshaft 540. Thus, when coupled together, the cylinder head 516 and cylinder block 514 may form one or more combustion chambers. As such, the combustion chamber 530 volume is adjusted based on an oscillation of the piston 536. Combustion chamber 530 may also be referred to herein as cylinder 530. The combustion chamber 530 is shown communicating with intake manifold 644 and exhaust manifold 648 via respective intake valves 652 and exhaust valves 654. Each intake and exhaust valve may be operated by an intake cam 551 and an exhaust cam 553. Alternatively, one or more of the intake and exhaust valves may be operated by an electromechanically controlled valve coil and armature assembly. The position of intake cam 551 may be determined by intake cam sensor 555. The position of exhaust cam 553 may be determined by exhaust cam sensor 557. Thus, when the valves 552 and 554 are closed, the combustion chamber 530 and cylinder bore may be fluidly sealed, such that gases may not enter or leave the combustion chamber 530.

Combustion chamber 530 may be formed by the cylinder walls 532 of cylinder block 514, piston 536, and cylinder head 516. Cylinder block 514 may include the cylinder walls 532, piston 536, crankshaft 540, etc. Cylinder head 516 may include one or more fuel injectors such as fuel injector 566, one or more intake valves 652, and one or more exhaust valves such as exhaust valves 654. The cylinder head 516 may be coupled to the cylinder block 514 via fasteners, such as bolts and/or screws. In particular, when coupled, the cylinder block 514 and cylinder head 516 may be in sealing contact with one another via a gasket, and as such the cylinder block 514 and cylinder head 516 may seal the combustion chamber 530, such that gases may only flow into and/or out of the combustion chamber 530 via intake manifold 644 when intake valves 652 are opened, and/or via exhaust manifold 648 when exhaust valves 654 are opened. In some examples, only one intake valve and one exhaust valve may be included for each combustion chamber 530. However, in other examples, more than one intake valve and/or more than one exhaust valve may be included in each combustion chamber 530 of engine 510.

In some examples, each cylinder of engine 510 may include a spark plug 692 for initiating combustion. Ignition system 690 can provide an ignition spark to cylinder 514 via spark plug 692 in response to spark advance signal SA from controller 512, under select operating modes. However, in some embodiments, spark plug 692 may be omitted, such as where engine 510 may initiate combustion by auto-ignition or by injection of fuel as may be the case with some diesel engines.

Fuel injector 566 may be positioned to inject fuel directly into combustion chamber 530, which is known to those skilled in the art as direct injection. Fuel injector 566 delivers liquid fuel in proportion to the pulse width of signal FPW from controller 512. Fuel is delivered to fuel injector 566 by a fuel system (not shown) including a fuel tank, fuel pump, and fuel rail. Fuel injector 566 is supplied operating current from driver 568 which responds to controller 512. In some examples, the engine 510 may be a gasoline engine, and the fuel tank may include gasoline, which may be injected by injector 566 into the combustion chamber 530. However, in other examples, the engine 510 may be a diesel engine, and the fuel tank may include diesel fuel, which may be injected by injector 566 into the combustion chamber. Further, in such examples where the engine 510 is configured as a diesel engine, the engine 510 may include a glow plug to initiate combustion in the combustion chamber 530.

Intake manifold 644 is shown communicating with throttle 562 which adjusts a position of throttle plate 564 to control airflow to engine cylinder 530. This may include controlling airflow of boosted air from intake boost chamber 646. In some embodiments, throttle 562 may be omitted and airflow to the engine may be controlled via a single air intake system throttle (AIS throttle) 582 coupled to air intake passage 542 and located upstream of the intake boost chamber 646. In yet further examples, AIS throttle 582 may be omitted and airflow to the engine may be controlled with the throttle 562.

In some embodiments, engine 510 is configured to provide exhaust gas recirculation, or EGR. When included, EGR may be provided as high-pressure EGR and/or low-pressure EGR. In examples where the engine 510 includes low-pressure EGR, the low-pressure EGR may be provided via EGR passage 535 and EGR valve 538 to the engine air intake system at a position downstream of air intake system (AIS) throttle 582 and upstream of compressor 662 from a location in the exhaust system downstream of turbine 664. EGR may be drawn from the exhaust system to the intake air system when there is a pressure differential to drive the flow. A pressure differential can be created by partially closing AIS throttle 582. Throttle plate 584 controls pressure at the inlet to compressor 662. The AIS may be electrically controlled and its position may be adjusted based on optional position sensor 588.

Ambient air is drawn into combustion chamber 530 via intake passage 542, which includes air filter 656. Thus, air first enters the intake passage 542 through air filter 656. Compressor 662 then draws air from air intake passage 542 to supply boost chamber 646 with compressed air via a compressor outlet tube (not shown in FIG. 5). In some examples, air intake passage 542 may include an air box (not shown) with a filter. In one example, compressor 662 may be a turbocharger, where power to the compressor 662 is drawn from the flow of exhaust gases through turbine 664. Specifically, exhaust gases may spin turbine 664 which is coupled to compressor 662 via shaft 661. A wastegate 572 allows exhaust gases to bypass turbine 664 so that boost pressure can be controlled under varying operating conditions. Wastegate 572 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 572 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered. As described above, the wastegate 572 and the plurality of vanes in the turbine 664 may be used to adjust boost pressure to conserve boost pressure for a subsequent high-load transient event while avoiding compressor surge. In this way, turbine 664 may be used similarly to turbine 16 of FIG. 1.

Compressor recirculation valve 658 (CRV) may be provided in a compressor recirculation path 6559 around compressor 662 so that air may move from the compressor outlet to the compressor inlet so as to reduce a pressure that may develop across compressor 662. A charge air cooler 657 may be positioned in boost chamber 646, downstream of compressor 662, for cooling the boosted aircharge delivered to the engine intake. However, in other examples as shown in FIG. 5, the charge air cooler 657 may be positioned downstream of the electronic throttle 562 in an intake manifold 644. In some examples, the charge air cooler 657 may be an air to air charge air cooler. However, in other examples, the charge air cooler 657 may be a liquid to air cooler.

In the depicted example, compressor recirculation path 659 is configured to recirculate cooled compressed air from upstream of charge air cooler 657 to the compressor inlet. In alternate examples, compressor recirculation path 6559 may be configured to recirculate compressed air from downstream of the compressor and downstream of charge air cooler 657 to the compressor inlet. CRV 658 may be opened and closed via an electric signal from controller 512. CRV 658 may be configured as a three-state valve having a default semi-open position from which it can be moved to a fully-open position or a fully-closed position.

Universal Exhaust Gas Oxygen (UEGO) sensor 626 is shown coupled to exhaust manifold 648 upstream of emission control device 570. Alternatively, a two-state exhaust gas oxygen sensor may be substituted for UEGO sensor 626. Emission control device 570 may include multiple catalyst bricks, in one example. In another example, multiple emission control devices, each with multiple bricks, can be used. While the depicted example shows UEGO sensor 626 upstream of turbine 664, it will be appreciated that in alternate embodiments, UEGO sensor may be positioned in the exhaust manifold downstream of turbine 664 and upstream of emission control device 570. Additionally or alternatively, the emission control device 570 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 570, wherein the sensor may be configured to diagnose a condition of the emission control device 570.

Controller 512 is shown in FIG. 5 as a microcomputer including: microprocessor unit 602, input/output ports 604, read-only memory 606, random access memory 608, keep alive memory 610, and a conventional data bus. Controller 512 is shown receiving various signals from sensors coupled to engine 510, in addition to those signals previously discussed, including: engine coolant temperature (ECT) from temperature sensor 612 coupled to cooling sleeve 614; a position sensor 634 coupled to an input device 630 (e.g., an accelerator pedal) for sensing input device pedal position (PP) adjusted by a vehicle operator 632; a knock sensor for determining ignition of end gases (not shown); a measurement of engine manifold pressure (MAP) from pressure sensor 621 coupled to intake manifold 644; a measurement of boost pressure from pressure sensor 622 coupled to boost chamber 646; an engine position sensor from a Hall effect sensor 618 sensing crankshaft 540 position; a measurement of air mass entering the engine from sensor 620 (e.g., a hot wire air flow meter); and a measurement of throttle position from sensor 568. Barometric pressure may also be sensed (sensor not shown) for processing by controller 512. In a preferred aspect of the present description, Hall effect sensor 618 produces a predetermined number of equally spaced pulses every revolution of the crankshaft from which engine speed (RPM) can be determined. The input device 630 may comprise an accelerator pedal and/or a brake pedal. As such, output from the position sensor 634 may be used to determine the position of the accelerator pedal and/or brake pedal of the input device 630, and therefore determine a desired engine torque. In one example, the input device 630 may be used similarly to the accelerator pedal 30 of FIG. 1. Thus, a desired engine torque as requested by the vehicle operator 632 may be estimated based on the pedal position of the input device 630. In the example of FIGS. 3 and 4, the desired boost pressure may be based on the desired engine torque and the position of the accelerator pedal. As such, the actual boost pressure may be intrusively conserved above the desired boost pressure during a low-load transient event (e.g., a tip-out) following a high-load transient event (e.g., a tip-in). By doing this, less boost may be generated during a subsequent tip-in, which may reduce lag, thereby increasing performance while also decreasing emissions.

In some examples, vehicle 505 may be a hybrid vehicle with multiple sources of torque available to one or more vehicle wheels 559. In other examples, vehicle 505 is a conventional vehicle with only an engine, or an electric vehicle with only electric machine(s). In the example shown, vehicle 505 includes engine 510 and an electric machine 552. Electric machine 552 may be a motor or a motor/generator. Crankshaft 540 of engine 510 and electric machine 552 are connected via a transmission 554 to vehicle wheels 559 when one or more clutches 56 are engaged. In the depicted example, a first clutch 556 is provided between crankshaft 540 and electric machine 552, and a second clutch 556 is provided between electric machine 552 and transmission 554. Controller 512 may send a signal to an actuator of each clutch 556 to engage or disengage the clutch, so as to connect or disconnect crankshaft 540 from electric machine 552 and the components connected thereto, and/or connect or disconnect electric machine 552 from transmission 554 and the components connected thereto. Transmission 554 may be a gearbox, a planetary gear system, or another type of transmission. The powertrain may be configured in various manners including as a parallel, a series, or a series-parallel hybrid vehicle.

Electric machine 552 receives electrical power from a traction battery 561 to provide torque to vehicle wheels 559. Electric machine 552 may also be operated as a generator to provide electrical power to charge battery 561, for example during a braking operation.

The controller 512 receives signals from the various sensors of FIG. 5 and employs the various actuators of FIG. 5 to adjust engine operation based on the received signals and instructions stored on a memory of the controller. For example, adjusting operation of the electric machine 552 may occur based on feedback from ECT sensor 612. As described above, operation of the turbocharger is adjusted in response to feedback from the position sensor 634 of the input device 630 to conserve boost pressure during some operating conditions.

In this way, operation of a turbocharger may be adjusted to avoid turbo lag during transient events. Vanes of the turbine may be moved to a more closed position during a tip-out or other low-load transient condition following a tip-in to intrusively maintain a boost pressure. That is to say, the boost pressure is maintained at a boost pressure above a desired boost pressure. The technical effect of maintaining a boost pressure generated during a previous tip-in event during a tip-out event is to minimize and/or avoid turbo lag during a subsequent tip-in. By doing this, emissions during high-load transient events may be reduced.

In one example, a method of operating a variable nozzle turbocharger of a vehicle, the vehicle having an engine, a variable nozzle turbocharger and a pedal moveable between a tip-out position and a tip-in position to control a fuel injection rate into a combustion chamber of the engine, the method comprises receiving a position signal relating to a position of a pedal, determining whether the signal is indicative of the pedal being in the tip-out position corresponding to a minimum fuel injection rate, and controlling variable vanes of the turbocharger to at least partially close in response to determining that the pedal is in the tip-out position.

In a first example, a method of operating a variable nozzle turbocharger comprises receiving a second position signal relating to a position of a pedal after controlling the variable vanes of the turbocharger to at least partially close, and controlling the variable vanes to re-open in response to determining that the second position signal indicates movement of the pedal towards the tip-in position.

An example of a controller for a vehicle having an engine, a pedal and a variable nozzle turbocharger, wherein the pedal is moveable between a tip-out position and a tip-in position to control a fuel injection rate into a combustion chamber of the engine, wherein the controller is configured to receive a position signal relating to a position of the pedal, and to determine whether the pedal is in the tip-out position corresponding to a minimum fuel injection rate based on the position signal, wherein the controller is configured to at least partially close variable vanes of the turbocharger in response to determining that the pedal is in the tip-out position.

An embodiment of a turbocharger control system comprises the controller and a sensor configured to generate the position signal relating to the position of the pedal.

An embodiment of a vehicle comprising an engine, a variable nozzle turbocharger, and a pedal, wherein the pedal is moveable between a tip-out position and a tip-in position to control the fuel injection rate of fuel into a combustion chamber of the engine, the vehicle further comprising the turbocharger control system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
    an engine;
    an accelerator pedal;
    a variable geometry turbocharger comprising a plurality of vanes adjacent a turbine inlet; and
    a controller with computer-readable instructions stored on non-transitory memory thereof that when executed enable the controller to:
        adjust the plurality of vanes to a closed position in response to a tip-out following a tip-in, wherein the tip-in includes the accelerator pedal more depressed than the tip-out; and
        adjust a position of a wastegate during the tip-out based on a compressor surge.

2. The system of claim 1, wherein the engine is an engine of a hybrid vehicle.

3. The system of claim 1, wherein the closed position is a fully closed position.

4. The system of claim 1, wherein the instructions further enable the controller to adjust the plurality of vanes to the closed position in response to the accelerator tip-in.

5. The system of claim 1, wherein a gear reduction occurs during the tip out.

6. The system of claim 1, wherein an actual boost pressure is maintained above a desired boost pressure during the tip out.

7. A method for a turbocharger of an engine, the method comprising:
   adjusting a plurality of vanes of a turbine to a fully closed position in response to a high-load transient event;
   adjusting the plurality of vanes to an open position more open than a previous position, wherein the more open position comprises a larger flow through area than the previous position, in response to an actual boost pressure being equal to a desired boost pressure;
   adjusting the plurality of vanes to the fully closed position in response to a low-load transient event following the high-load transient event to maintain an actual boost pressure above a desired boost pressure; and
   adjusting a position of a wastegate during the low-load transient event as a compressor surge increases to a compressor surge limit.

8. The method of claim 7, wherein the plurality of vanes is maintained in the fully closed position during the low-load transient event to conserve boost pressure generated during the high-load transient event.

9. The method of claim 7, wherein high-load transient event comprises an accelerator pedal tip-in, wherein the low-load transient event comprises an accelerator pedal tip-out, wherein the accelerator pedal tip-in comprises where an accelerator pedal is depressed, and wherein the accelerator pedal tip-out comprises where the accelerator pedal is released.

10. The method of claim 7, further comprising adjusting the plurality of vanes to a more open position or to a fully open position during the low-load transient event in response to the compressor surge limit being approached.

11. The method of claim 10, further comprising opening the wastegate in response to the compressor surge limit being approached.

12. The method of claim 10, further comprising adjusting the plurality of vanes to the fully closed position during a subsequent high-load transient event following the low-load transient.

13. The method of claim 10, wherein the desired boost pressure is based on a driver demand.

14. A system, comprising:
   an engine;
   a turbocharger comprising a compressor and a turbine, wherein the turbine comprises a plurality of vanes configured to adjust an inlet flow through area of the turbine; and
   a controller comprising computer-readable instructions stored on non-transitory memory thereof that when executed enable the controller to:
      adjust the plurality of vanes to a fully closed position in response to a high-load transient event;
      adjust the plurality of vanes to an open position more open than a previous position, wherein the more open position comprises a larger inlet flow through area than the previous position, in response to an actual boost pressure being equal to a desired boost pressure;
      adjust the plurality of vanes to the fully closed position in response to a low-load transient event following the high-load transient event; and
      adjust a position of a wastegate during the low-load transient event based on a compressor surge.

15. The system of claim 14, wherein the instructions further enable the controller to adjust the plurality of vanes to a more-open position in response to the compressor surge.

16. The system of claim 15, wherein the instructions further enable the controller to adjust the plurality of vanes to the fully closed position in response to a subsequent high-load transient event following the low-load transient event.

* * * * *